(12) United States Patent
Anderberg

(10) Patent No.: US 7,596,826 B2
(45) Date of Patent: Oct. 6, 2009

(54) DEVICE FOR PASSENGER BRIDGES FOR AIRCRAFT

(75) Inventor: Nils-Erik Anderberg, Trelleborg (SE)

(73) Assignee: FMT International Trade AB, Trelleborg (SE)

( * ) Notice: Subject to any disclaimer, the term of this patent is extended or adjusted under 35 U.S.C. 154(b) by 0 days.

(21) Appl. No.: 10/592,561

(22) PCT Filed: Mar. 18, 2005

(86) PCT No.: PCT/SE2005/000399

§ 371 (c)(1),
(2), (4) Date: May 31, 2007

(87) PCT Pub. No.: WO2005/090160

PCT Pub. Date: Sep. 29, 2005

(65) Prior Publication Data

US 2007/0235591 A1    Oct. 11, 2007

(30) Foreign Application Priority Data

Mar. 23, 2004    (SE) .................................... 0400741

(51) Int. Cl.
*E01D 15/00* (2006.01)
*E01D 1/00* (2006.01)

(52) U.S. Cl. ........................................ 14/71.5; 14/69.5

(58) Field of Classification Search .................. 14/69.5, 14/71.5
See application file for complete search history.

(56) References Cited

U.S. PATENT DOCUMENTS

| | | | | |
|---|---|---|---|---|
| 3,541,626 A * | 11/1970 | Eggert, Jr. | .................... | 135/128 |
| 3,693,204 A | 9/1972 | Eggert, Jr. | .................... | 14/71.5 |
| 4,110,859 A * | 9/1978 | Lichti | .................... | 14/71.5 |
| 4,490,869 A * | 1/1985 | Morin | .................... | 14/71.5 |
| 4,553,720 A * | 11/1985 | Harder | .................... | 244/137.2 |
| 5,257,431 A * | 11/1993 | Larson et al. | ................. | 14/71.5 |
| 6,122,789 A * | 9/2000 | Stephenson et al. | .......... | 14/71.5 |
| 6,195,826 B1 | 3/2001 | LeBaron et al. | ............... | 14/71.5 |
| 6,898,816 B2 * | 5/2005 | Tholen et al. | ................. | 14/71.5 |
| 7,069,611 B2 * | 7/2006 | Larson | .................... | 14/71.3 |
| 7,188,383 B2 * | 3/2007 | Tholen et al. | ................. | 14/71.5 |
| 2002/0116771 A1 | 8/2002 | Coles et al. | .................. | 14/71.5 |

* cited by examiner

*Primary Examiner*—Raymond W Addie
(74) *Attorney, Agent, or Firm*—Alfred J. Mangels

(57) ABSTRACT

A cabin for a passenger bridge for the enplaning and deplaning of passengers. The passenger bridge has the form of a tunnel and the cabin is at its outer free end. The bridge can be maneuvered relative to the ground and to the airplane such that the cabin can be docked to an airplane at a door. The cabin includes a roof, side walls, a floor, and an opening at its free end. The floor of the cabin can be displaced relative to the other parts of the cabin to a limited extent in an outward direction from a rest position within the cabin. The floor can be tilted upwards and downwards around a pivot joint along the rear edge of the floor located in the cabin.

12 Claims, 4 Drawing Sheets a  b  c

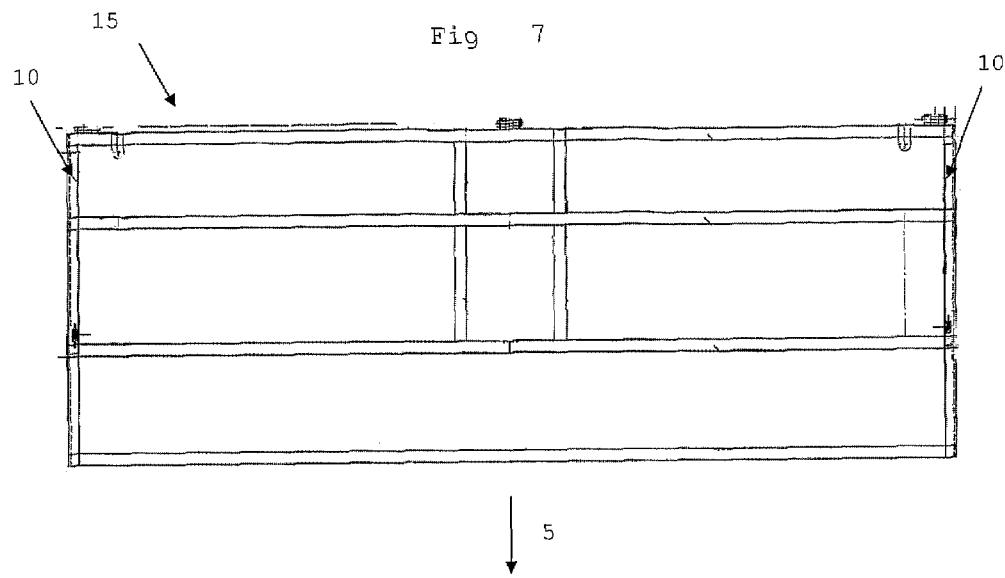
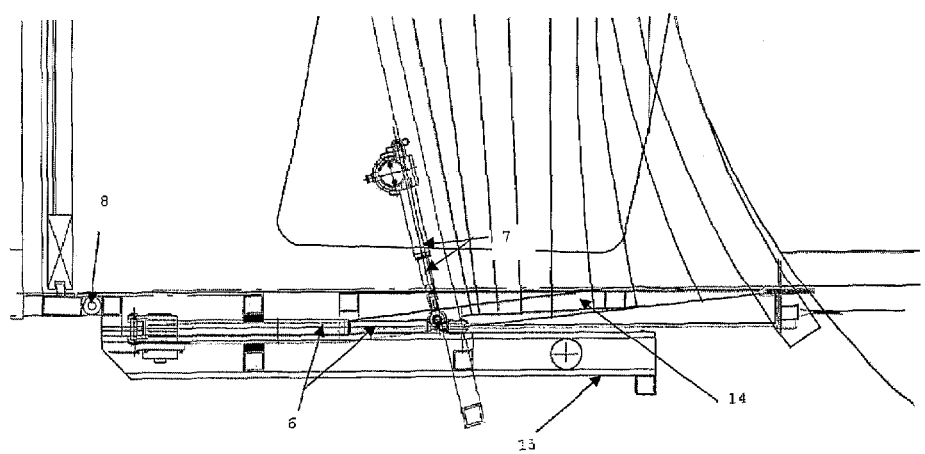

US 7,596,826 B2

DEVICE FOR PASSENGER BRIDGES FOR AIRCRAFT

BACKGROUND OF THE INVENTION

1. Field of the Invention

The present invention relates to a cabin for a passenger bridge for the passage of passengers into and out of an airplane.

2. Description of the Related Art

A large number of airports throughout the world currently use passenger bridges that are located next to an opening in the airport terminal building at one of the airport gates. These passenger bridges make it safe and easy for the passengers to enplane and deplane, since the passengers do not need first to exit from the airport terminal and then to go onboard the airplane from the ground.

Passenger bridges are normally jointed, for example, relative to the ground, adjacent to the terminal building in the form of, for example, a solid pillar. When the passengers pass from the gate of a terminal building into the associated passenger bridge they walk inside the bridge. It consists of tunnels. The passenger bridge includes a cabin at the junction between the passenger bridge and the airplane. The sides and the most external part of the roof of the cabin, which are in contact with the airplane fuselage when people are to enplane or deplane, are in the form of a bellows. This follows the outer shape of an individual airplane and in this way provides contact between the passenger bridge and the airplane fuselage.

The floor of the cabin includes a fixed floor with straight lines. When people are to enplane or deplane, the complete passenger bridge is maneuvered such that the cabin is located as close to the airplane as possible, leaving only a small gap, without colliding with the airplane. A threshold is subsequently placed between the floor of the cabin and that of the airplane. The gap between the cabin and the airplane is bridged in this way, and passengers can avoid tripping, for example.

When an airplane has landed at an airport and is parked at a gate, the bridge will be maneuvered such that it approaches sufficiently close to the airplane. The bridge is maneuvered from a control panel inside the bridge or the cabin. The complete bridge is maneuvered, as has been mentioned above, partly in a lateral direction, partly in a longitudinal direction and partly vertically, and partly around a connection in the form of a rotunda. This maneuvering is performed in this way to displace the complete bridge, and to place the cabin of the bridge sufficiently close to the fuselage of the airplane.

There are also other fields of application of such bridges, for example for the embarkation and disembarkation at large passenger and boat ferries. However, the present invention will be described using an example in which an airplane is docked.

The typical bridge is a system that is solidly built and may weigh up to several tens of tons. When the mass of the bridge is maneuvered, the bridge has a very high kinetic energy, and this makes it difficult to maneuver the bridge for fine adjustments. The maneuvering can be even more difficult at airports with snow and ice on the ground. If there is ice on the ground, the driving means of the bridge relative to the ground may, for example, slide, whereby the displacement of the bridge lies to a certain extent beyond the control of the operator.

Since it is desirable that the cabin of the bridge is placed sufficiently close to the airplane for the passengers to be able to enplane and deplane in a safe manner, there is a risk that the operator unintentionally maneuvers the bridge such that its cabin collides with the fuselage of the airplane. Given the kinetic energy that the bridge possesses, there are major risks that the fuselage of the airplane will be damaged in some way, for example, that the fuselage of the airplane acquires notches, microcracks, or deformations. Airplane safety is very high, and for this reason damaged airplanes must be withdrawn from the planned route in order to be examined and checked. In the event of minor collisions with the cabin, these checks may be sufficient if there is no damage to the airplane fuselage discovered during the check, but it may be necessary to repair the airplane fuselage in the event of somewhat more violent collisions. This gives rise to major costs for the company that owns the airplane, since the airplane must not only be withdrawn from its route, but also repaired.

SUMMARY OF THE INVENTION

The present invention thus relates to a cabin for a passenger bridge for the enplaning and deplaning of passengers. The passenger bridge has the form of a tunnel and is equipped with the cabin at its outer free end, and it can be maneuvered relative to the ground and to the airplane such that the cabin can be docked to an airplane at a door of the airplane. The cabin includes a roof, side walls, and a floor, together with an opening at its free end. The floor of the cabin can be displaced relative to the other parts of the cabin to a limited extent by means of a first force-exerting means in a direction out from the cabin from a resting position, and can be withdrawn from inside of the cabin. The floor can be tilted by means of a second force-exerting means upwards and downwards around a pivot joint at the rear edge of the floor located in the cabin.

BRIEF DESCRIPTION OF THE DRAWINGS

The invention will be described in more detail below, partially with reference to non-limiting embodiments of the invention shown in the attached drawings, where

FIG. 7 shows a lower framework in cross section as seen from above;

FIG. 8 shows a cross section of the first and the second force-exerting means, respectively including ball screws and hydraulic cylinders.

DESCRIPTION OF THE PREFERRED EMBODIMENTS

Figure 1:
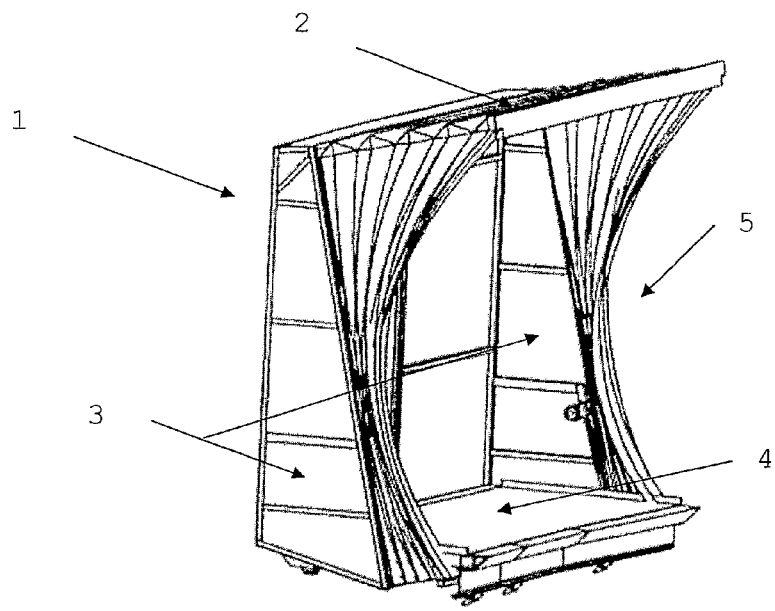
FIG. 1 shows schematically a cabin for a passenger bridge.

The present invention relates to a cabin 1, see FIG. 1, arranged at the free end of a passenger bridge (not shown). The cabin 1 is used during the enplaning and deplaning of passengers. The passenger bridge has the form of a tunnel with a floor, walls, and a roof. The passenger bridge can include several telescopic, tunnel-forming elements in order to regulate the length of the bridge. When the desired length of the bridge is to be reached the outer tunnels, for example, can be pressed into the inner tunnels until the correct length of the bridge has been achieved. When a longer tunnel is required, the inner tunnels are withdrawn a certain amount outward from the outer tunnels.

The passenger bridge can be maneuvered such that it can be docked to an airplane at a door of the airplane. The maneuvering takes place relative to the ground and to the airplane. The cabin 1 includes a roof 2, side walls 3, and a floor 4, together with an opening 5 at its free end.

Figure 2:
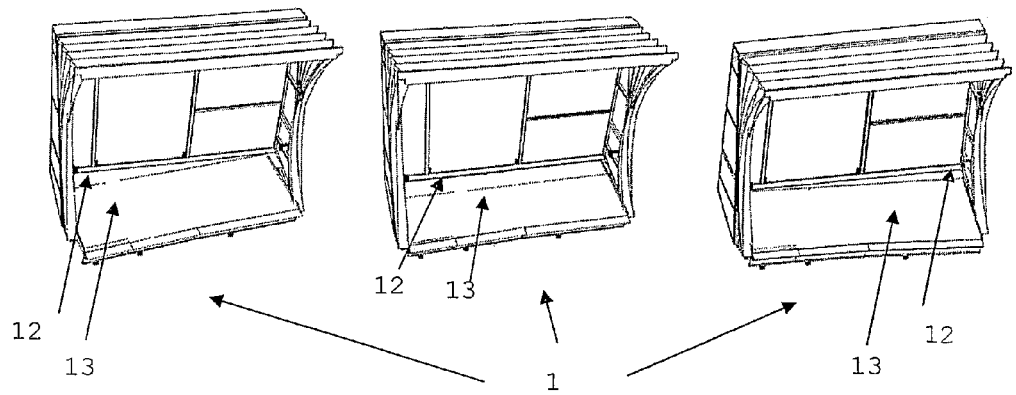
FIGS. 2a-c show schematically the cabin with an outer section of the floor at different positions.

The floor 4 of the cabin 1 includes, according to the invention, a fixedly mounted inner part 12 and an outer part 13 that can be displaced, as shown in FIGS. 2a-c. The cabin 1 is seen in FIG. 2 with the outer part 13 of the floor 4 in different positions. The inner part 12 of the floor is mounted fixed relative to the cabin 1, and thus is located at the same position in all of the FIGS. 2a-c. The outer part 13 of the floor, on the contrary, moves by virtue of a first force-exerting means (not shown in FIGS. 2a-c), by means of which the outer part 13 of the floor is extended from the cabin 1. The part 13 can thus be moved and it is mounted overlapping the inner fixed part 12. FIG. 2a shows the outer part 13 turned to the right, relative to FIG. 2a. FIG. 2b shows the outer part 13 extended directly outwards from the cabin. FIG. 2c shows the outer part 13 turned to the left, relative to FIG. 2c.

Figure 3:
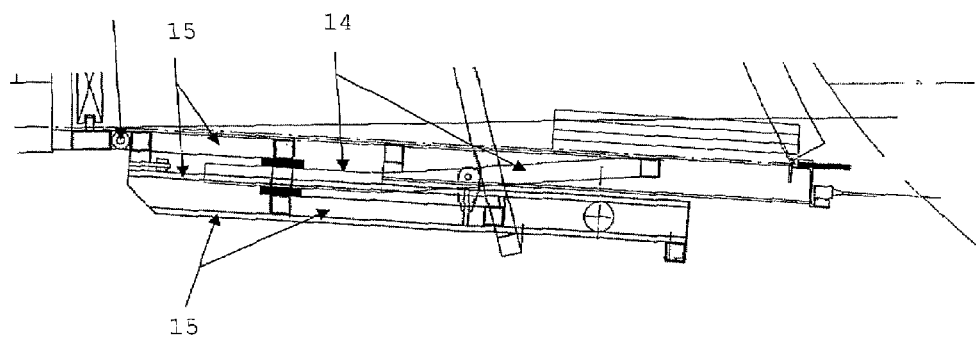
FIG. 3 shows a cross section of the cabin floor with a first means of exerting force and an upper framework in a withdrawn resting position.
Figure 4:
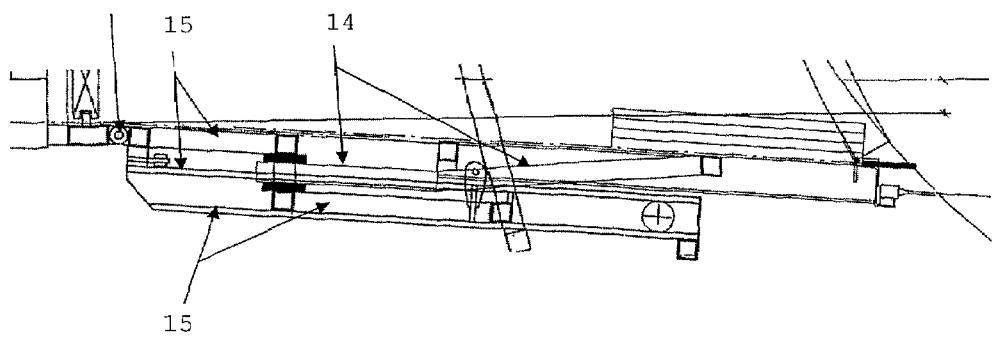
FIG. 4 shows a cross section of the cabin floor with a first means of exerting force and a lower framework in an extended position.

FIG. 3 shows that the outer part 13 of the floor 4 is attached by means of a first force-exerting means (not shown in FIG. 3) to an upper framework 14, displaceable to a limited degree in a direction out from the cabin 1. The uppermost layer of the floor 13 rests against the upper framework 14. When the first force-exerting means, and thus the upper framework 14, are located in a resting position, the moveable outer part 13 of the floor is fully pressed in towards the cabin 1, see FIG. 3. The first force-exerting means, and thus the upper framework 14, can be displaced outwardly from the cabin 1 in a horizontal direction, see FIG. 4. The outer part 13 of the floor is extended in this manner.

Figure 5:
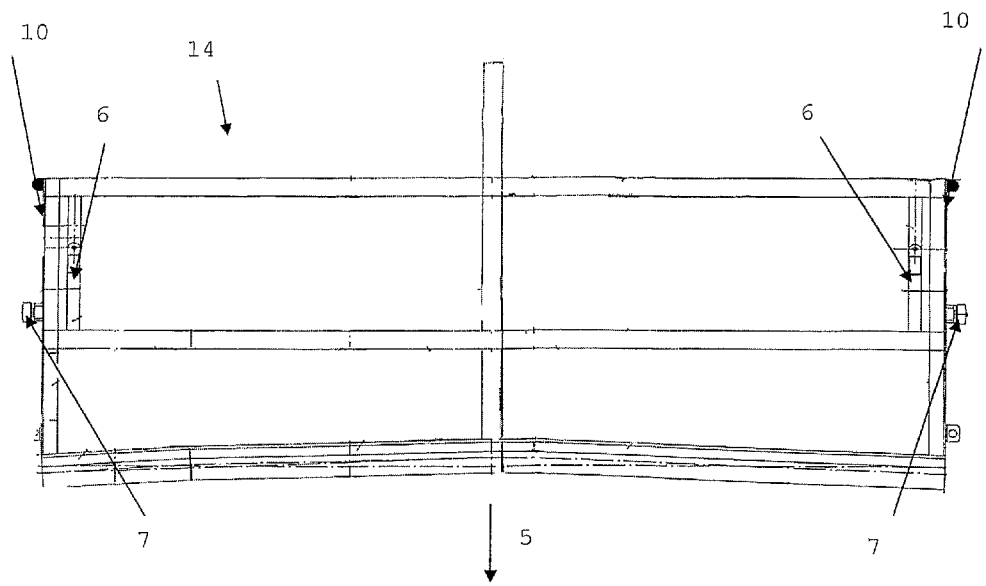
FIG. 5 shows an upper framework in a cross-section as seen from above.

FIG. 5 shows the upper framework 14 seen from above, where the framework 14 supports the moveable outer part 13 of the floor and is attached to the first force-exerting means 6, see FIG. 8. The arrow 5a in FIG. 5 shows the direction in which the opening 5 of the cabin 1 is movable relative to FIG. 5. The first force-exerting means 6 includes two means 6 of providing force, each located at the two side edges 10 of the outer part 13 of the floor 4, see FIG. 5. The two force-exerting means 6 run essentially perpendicular to the opening 5 of the cabin 1, and they can be individually maneuvered such that the outer part 13 of the floor 4 can be rotated to a limited extent in the plane of the floor 4.

Figure 6:
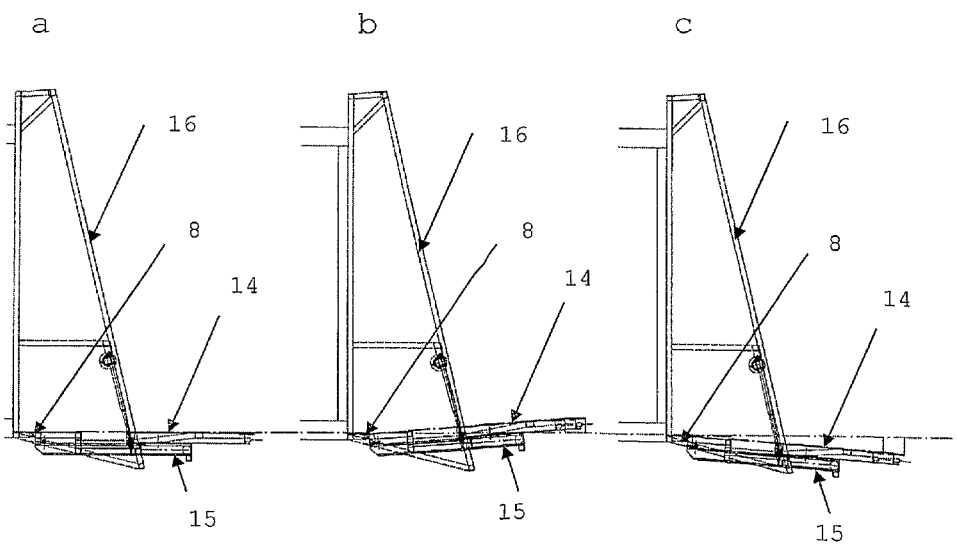
FIGS. 6a-c show cross sections of the two means of exerting force with the second means of exerting force at three different positions.

Furthermore, the outer part 13 of the floor 4 has a second force-exerting means 7 (see FIG. 8) connected to lower framework 15 and connected to the framework 16 of the cabin (see FIGS. 1 and 6). As shown in FIG. 6, force-exerting means 7 can tilt the upper framework 14 and outer part 13 of the floor 4 up and down relative to the horizontal plane around a pivot joint 8 that is located at the rear edge of the outer part 13 of the floor 4 located in the cabin 1.

FIG. 7 shows the lower framework 15 as seen from above, wherein the lower framework 15 also supports the upper framework 14 and is attached to the second force-exerting means 7. The arrow 5a shows the direction in which the opening 5 of the cabin 1 is located relative to FIG. 7. The second force-exerting means 7 includes two force-exerting means 7, each located at one of the two side edges 10 of the outer part 13 of the floor 4, see FIG. 5. Furthermore, the two force-exerting means 7 are attached to the framework 16 of the cabin 1, as shown in FIG. 6. The second force-exerting means run essentially perpendicular to the floor 4 of the cabin 1.

It is a major advantage that the bridge is only coarsely adjusted during the maneuvering of the complete bridge, and that the floor 4 of the cabin 1 is moved when the cabin floor is to be finely adjusted.

According to one preferred embodiment, the force of the first force-exerting means 6, with which the outer part 13 of the floor is extended from the cabin 1, can deliver a maximum force that is significantly less than the force with which the fuselage of the aircraft can be depressed or in any other way damaged, which is a further advantage.

According to one preferred embodiment, the first force-exerting means 6 are, for example, hydraulic cylinders, see FIG. 8.

According to a further embodiment, the second force-exerting means 7 are in the form of hydraulic cylinders or ball screws, see FIG. 8.

According to a further embodiment, the force-exerting means 6, 7 are in the form of pneumatic cylinders.

According to a further embodiment, the floor of the cabin is formed of a fixed inner part and at least two moveable outer parts.

A number of embodiments have been described above. However, the force-exerting means 6, 7, the upper and the lower frameworks 14, 15, together with the outer moveable part 13 or parts of the floor, can be designed in another suitable manner without deviating from the fundamental idea of the invention.

Thus the present invention is not limited to the embodiments specified above, since it can be varied within the scope of the attached patent claims.

What is claimed is:

1. A cabin for a passenger bridge for the enplaning and deplaning of passengers, which passenger bridge has the form of a tunnel and is equipped with the cabin at its outer free end, and which passenger bridge can be maneuvered relative to the ground and relative to the airplane such that the cabin can be docked to an airplane at a door of the airplane, said cabin comprising: a cabin frame including a roof, side walls, a two-portion floor, and an opening at a cabin free end, wherein the floor of the cabin includes an inner floor portion that is fixed in position relative to the cabin frame and an outer floor portion that is movable relative to the inner floor portion and at least partially overlaps the inner floor portion, wherein the outer floor portion has a unitary front edge that is displaced as an entirety relative to other parts of the cabin by a first force-exerting means in an outward direction relative to the cabin opening and from a rest position within the cabin, wherein the inner and outer floor portions are tiltable relative to the cabin frame by a second force-exerting means upwards and downwards around a pivot joint at an inner rear edge of the inner floor portion and located inward of the cabin opening, and wherein the first and second force-exerting means deliver a maximum force that is less than a force with which an aircraft fuselage is damaged by impact of the outer floor portion with the aircraft fuselage.

2. A cabin according to claim 1, wherein the first force-exerting means includes two first components each located at respective side edges of the floor, which first components extend essentially perpendicular to the opening of the cabin, and wherein the two first components are individually maneuverable such that the outer floor portion can be rotated in the plane of the floor.

3. A cabin according to claim 1, wherein the second force-exerting means includes two second components each located between respective side edges of the floor and a framework of the cabin, which second components extend substantially perpendicular to the floor of the cabin.

4. A cabin according to claim 1, wherein the floor inner portion is retained within the cabin, and the floor outer portion is displaceable relative to the floor inner portion toward and away from the cabin opening and is mounted in at least partial overlapping relationship with the floor inner portion.

5. A cabin according to claim 1, wherein the first force-exerting means are hydraulic cylinders.

6. A cabin according to claim 1, wherein the second force-exerting means are at least one of hydraulic cylinders and ball screws.

7. A cabin for a passenger bridge for docking against an airplane fuselage at a passenger door of the airplane, said cabin comprising: a roof, side walls, and a floor and including an opening at a free end; wherein the floor of the cabin includes a fixed inner floor portion and a movable outer floor portion that at least partially overlaps the inner floor portion, wherein the outer floor portion includes a continuous outer edge that is displaceable relative to other parts of the cabin by a first force-exerting means in a direction toward and away from the cabin opening from a rest position within the cabin; wherein the inner and outer floor portions are upwardly and downwardly tiltable as a unit by a second force-exerting means at a pivot joint positioned along an inner rear edge of the inner floor portion and located inward of the cabin opening, and wherein the first and second force-exerting means deliver a maximum force that is less than a force with which an aircraft fuselage is damaged by impact of the floor with the aircraft fuselage.

8. A cabin for a passenger bridge for docking against an airplane fuselage at a passenger door of the airplane, said cabin comprising:

a cabin frame and a roof, side walls, and a floor and including an opening at a free, outer end for engagement with an aircraft fuselage at an aircraft door, wherein the floor includes an inner floor portion that is retained within the cabin frame and is carried on a lower floor framework that is pivotally supported by the cabin frame for pivotal movement about a floor pivot axis spaced inwardly of and substantially parallel to an outer edge of the cabin opening;

an outer floor portion that is carried on an upper floor framework that is movably supported on the lower floor framework and that at least partially overlaps the inner floor portion, wherein the outer floor portion includes a continuous outer edge and is displaceable relative to the inner floor portion in a direction toward and away from the cabin opening;

first force exerting means extending between and connected to each of the lower floor framework and the upper floor framework for displacing the outer floor portion relative to the inner floor portion in a direction toward and away from the cabin opening;

second force exerting means extending between and connected to each of the cabin frame and the lower floor framework for pivotally displacing the lower floor framework and the upper floor framework about the floor pivot axis, whereby the continuous outer edge of the outer floor portion is displaced in an upward and downward direction relative to the floor pivot axis; and wherein the first force exerting means exerts a predetermined maximum force that is less than a force that would damage an aircraft fuselage upon displacement by the first force exerting means of the outer edge of the outer floor portion into contact with an aircraft fuselage.

9. A cabin according to claim 8, wherein the first force-exerting means includes two first components each located at respective side edges of the floor, which first components extend essentially perpendicular to the opening of the cabin, and wherein the two first components are individually maneuverable such that the outer floor portion can be rotated in the plane of the floor.

10. A cabin according to claim 8, wherein the second force-exerting means includes two second components each located between respective side edges of the floor and a framework of the cabin, which second components extend substantially perpendicular to the floor of the cabin.

11. A cabin according to claim 8, wherein the first force-exerting means are hydraulic cylinders.

12. A cabin according to claim 8, wherein the second force-exerting means are at least one of hydraulic cylinders and ball screws.

* * * * *